(12) United States Patent
Macbeth

(10) Patent No.: US 6,370,001 B1
(45) Date of Patent: *Apr. 9, 2002

(54) CIRCUIT PROTECTOR WITH SELF-TEST CIRCUIT

(75) Inventor: Bruce F. Macbeth, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/694,612

(22) Filed: Oct. 23, 2000

Related U.S. Application Data

(63) Continuation of application No. 09/089,475, filed on Jun. 2, 1998, now Pat. No. 6,266,219.

(51) Int. Cl.[7] ............................................. H01H 47/00
(52) U.S. Cl. .......................... 361/170; 361/102; 361/42; 324/424
(58) Field of Search ................................ 361/160, 170, 361/187, 99, 102, 42; 324/424

(56) References Cited

U.S. PATENT DOCUMENTS

| 4,077,056 A | * | 2/1978 | Galiana | 361/50 |
| 4,412,328 A | * | 10/1983 | Home | 714/25 |
| 5,459,630 A | * | 10/1995 | MacKenzie et al. | 361/45 |
| 5,650,773 A | * | 7/1997 | Chiarello | 340/691 |
| 6,169,405 B1 | * | 1/2001 | Baltzer et al. | 324/424 |

* cited by examiner

Primary Examiner—Michael J. Sherry
(74) Attorney, Agent, or Firm—Wall Marjama & Bilinski

(57) ABSTRACT

A combined ground fault and arc fault detector includes interrupting contacts which are opened when either an arc fault or a ground fault is detected. The detector includes a test circuit which creates a simulated fault and momentarily de-energizes the coil to test the detector and re-energizes the coil before the interrupting contacts open.

1 Claim, 1 Drawing Sheet

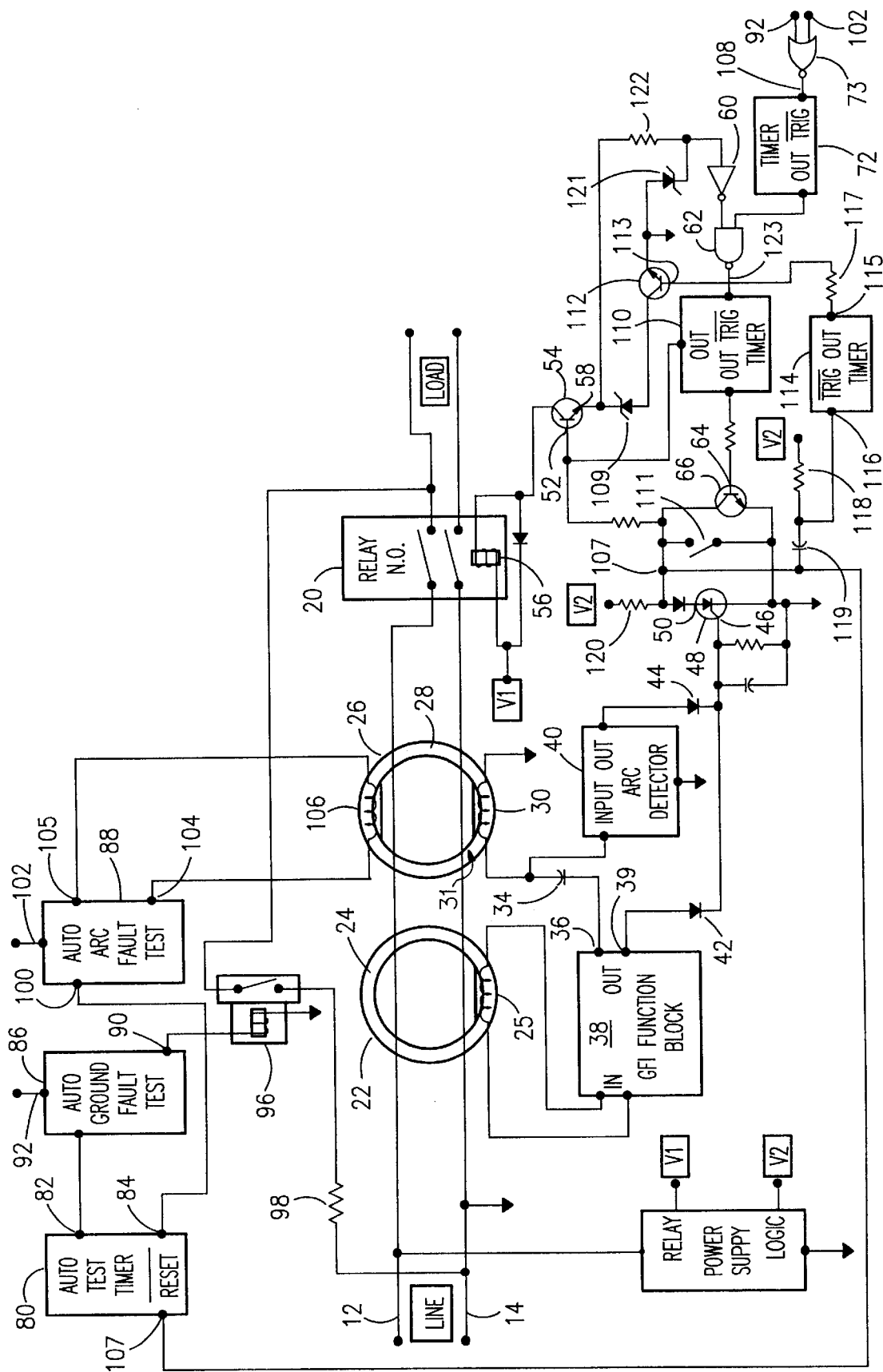

CIRCUIT PROTECTOR WITH SELF-TEST CIRCUIT

This is a Continuation of application Ser. No. 09/089,475 filed Jun. 2, 1998, which is now U.S. Pat. No. 6,266,219, the entirety of which is incorporated herein by reference.

FIELD OF THE INVENTION

This invention relates generally to devices for protecting electrical circuits in the event of faults, and more particularly to a device for protecting a circuit against ground faults and arc faults.

Ground fault circuit interrupters have become quite widely used and they provide the very useful function of disconnecting an electrical power source from a load when a ground fault is detected. Among the more common types of ground faults sensed by known ground fault circuit interrupters are those caused when a person accidentally makes contact with a hot electrical lead and ground. In the absence of a ground fault circuit interrupter, life threatening amounts of currents could flow through the body of the person.

Virtually all ground fault circuit interrupters use a differential current transformer for sensing ground faults. The current transformer is arranged with the hot and neutral leads of an electrical circuit passing through the center of a transformer, preferably a toroidal transformer with a symmetrically wound secondary formed thereon. In normal operation of an electrical circuit, the currents flowing through the hot electrical conductor and neutral electrical conductor are equal and opposite, and no output signal is produced by the differential transformer. When a ground fault occurs, the currents are no longer the same, and the differential transformer produces a signal that can be sensed by appropriate signal conditioning circuitry to activate a relay or contactor or the like to interrupt the electrical circuit.

Ground fault circuit interrupters must also deal with a fundamentally different type of fault that occurs when the neutral conductor is connected to the ground conductor, in the downstream circuit powered by the ground fault circuit interrupter where the neutral and ground connections are intentionally but wrongly connected together, or by accidental short circuits formed for example when a strand of a stranded electrical conductor accidentally bridges the neutral and ground connections.

If a "grounded neutral" fault of the type just discussed occurs in a circuit in which the ground and neutral lines are connected together, for example, and a person inadvertently makes contact with a hot electrical lead while also connected to the grounded neutral fault, the return current is divided between the neutral electrical conductor and ground conductor. Of the two, the neutral conductor passes through the differential transformer, and only a fraction of the ground fault current is available to be sensed. The neutral electrical conductor can be a larger gauge wire than the ground conductor, and will not include resistive connections such as in conduit grounds, and therefore the larger portion of the ground fault current often flows in the neutral wire. In a circuit where a 6 milli-amp ground fault current flows through a person, for example, it may result in three-quarters of the current flowing through the neutral wire where it is seen as a load current and not detected and only one quarter flowing through the ground conductor. Therefore, a much larger ground fault current must flow before the fault will be detected, all to the detriment of the person through whom the ground fault current flows.

The problem just mentioned has been commonly addressed by providing a second transformer, sometimes referred to as a grounded neutral transformer. The second transformer is arranged with the hot and neutral lines extending through the core of the transformer, forming a first winding, and another winding wound on the toroidal core forming the second. Rather than sensing differential current through the second winding wound on the toroidal core, however, an oscillator is connected thereto with the second winding of the grounded neutral transformer forming a part of the resonant circuit of the oscillator. In the absence of a ground neutral connection, there is insufficient feedback in the oscillator to initiate and sustain oscillation. However, when a grounded neutral fault occurs, it forms a closed coupling loop between differential and neutral transformers, a feedback path is created and oscillation is initiated. The oscillation induces a current in the neutral lead that is detected in the same manner as a ground fault by the primary differential transformer.

Ground fault circuit interrupters of the type just described detect both conventional ground faults, and ground faults in the presence of intentional or accidental grounded-neutral faults.

It is desirable to provide a circuitry for detecting arc faults as well as ground faults. Arc faults are typically undetectable by the differential transformer or the grounded neutral transformer of a ground fault circuit interrupter, because the wave forms produced by an arc fault appear on both the hot and neutral lines.

One approach to sensing grounded neutral faults is to provide a transformer, through which only the neutral line of the electrical circuit passes.

If a grounded neutral transformer is provided that has only the neutral line passing therethrough, it will not be able to sense grounded neutral conditions that arise when an electrical circuit is inadvertently connected to the ground fault circuit interrupter with the hot and neutral cable wires reversed. Therefore, a grounded neutral transformer is preferably arranged with both the hot and neutral lines passing through the neutral transformer and forming two secondaries thereof.

An arc fault cannot be readily sensed at such a transformer, and a third transformer is ordinarily provided whose primary is only one of the hot and neutral leads for detecting arc faults.

The need for three transformers, a primary differential transformer for sensing ground faults, a grounded neutral transformer, and an arc fault sensing transformer, creates a particular problem. Often there is simply not enough room for all three transformers and their associated circuitry to be included in a package that will fit in the space provided for a duplex receptacle, for example.

There is a need for a combined arc fault and ground fault circuit interrupter. The amount of circuitry required for sensing ground faults and arc faults, and opening an electrical circuit in response thereto, makes it difficult to physically package all of the necessary components in a duplex receptacle, for example.

Because a differential ground fault sensing transformer must be as symmetrical as possible to reduce common mode response, signals indicating arc faults cannot be sensed from the secondary winding of the differential transformer. Applicants have discovered, however, that it is possible to sense signals representing arc faults with a carefully designed asymmetrical transformer that is also suitable for use as a grounded neutral transformer as described above.

Although theoretically perfect transformers of the toroidal type having hot and neutral leads passing therethrough to form the primary, are not responsive to arc faults for producing a usable signal, applicants have discovered that an asymmetrical transformer can be built that produces usable signals indicative of arc faults, and can at the same time be used for coupling a signal for sensing grounded neutral conditions to the neutral conductor of an electrical circuit.

It is an object of this invention to provide a combined ground fault and arc fault circuit interrupter in a compact package that includes a first differential transformer for producing signals indicative of a ground fault and a second asymmetrical transformer having a winding disposed thereon for both producing signals indicative of an arc fault and for coupling a signal from an oscillator to the neutral wire passing through the transformer for causing a fault condition in the event of a grounded neutral fault.

It is another object to provide a second winding for injecting an arc test signal for testing the AFCI function.

Briefly stated, and in accordance with a presently preferred embodiment of the invention, a combined ground fault and arc fault circuit interrupter includes a differential current transformer, a hot electrical line and a neutral electrical line passing through the current transformer and forming the primary thereof, an asymmetrical toroidal transformer having a core through which the hot and neutral electrical leads pass, and a secondary wound on the core for producing a signal more strongly responsive to the current in one of the line conductors than the other. An arc fault detector is connected to the secondary of the second transformer, while a ground fault detector is connected to the secondary of the first transformer, and the outputs of the ground fault and arc fault detectors are both connected to a circuit interrupter arranged for disconnecting the circuit when either a ground fault or an arc fault is detected.

BRIEF DESCRIPTION OF THE DRAWINGS

The novel aspects of the invention are set forth with particularity in the appended claims. The invention itself together with further objects and advantages thereof may be more readily comprehended by reference to the following detailed description of a presently preferred embodiment of the invention, taken in conjunction with the accompanying drawing, in which:

The drawing is a schematic diagram of a combination ground fault and arc fault interrupter in accordance with the invention.

DESCRIPTION OF THE PREFERRED THE EMBODIMENT

Referring now to the drawing, a schematic diagram of a combined ground fault circuit interrupter and arc fault circuit interrupter is shown. A hot electrical line 12 and a neutral electrical line 14 are connected between a primary power source and a load (not shown). A normally open electrical relay 20 or contactor is connected in circuit relationship between the power source and the load for interrupting the hot and neutral lines in the event of a fault.

A first differential current transformer 22, preferably formed on a toroidal core 24 of permeable material is arranged with the hot 12 and neutral 14 electrical conductors extending therethrough to form differential primary. A symmetrical secondary winding 25 is preferably formed on the toroidal core 24 for producing an electrical signal at its secondary corresponding to the differential current between the hot and neutral lines. Preferably, the core and winding are constructed symmetrically so as to maximize common mode rejection, that is to produce as close to zero signal output as possible when the hot and neutral lines are carrying the same but opposite currents.

A ground fault circuit detector 38 is connected to the secondary winding 25 of the differential current transformer 22. The ground fault detector circuit may be of any of the arrangements known to those skilled in the art, and preferably includes an oscillator producing a signal at an output.

A second, asymmetrical, toroidal transformer 26 is also arranged with the hot 12 and neutral 14 lines extending through a toroidal core of forming a differential primary. An asymmetrical winding 30, such as a winding formed over only a portion of the circumference of the core, can be used to provide a differential signal at the output thereof that has low common mode rejection, that is a signal which is more responsive to the current flowing in one of the conductors than the other. Alternatively, the toroidal core may be rendered unsymmetrical for example, by filing a notch or otherwise removing a portion of the core at one or more discrete locations thereon, for reducing the common mode rejection of the transformer.

A capacitor 34 is connected to one end of the secondary winding 30 to form a resonant circuit. The other end of the capacitor is connected to an oscillator output 36 in the ground fault detector 38 for providing an oscillating signal to the secondary of the transformer. The ground fault detector 38 produces an output signal at an output 39 when a grounded neutral condition or a conventional ground fault, or both exist. Except for the use of an unsymmetrical transformer, the circuitry for detecting a grounded neutral condition is known to those skilled in the art.

The use thereof in connection with an unsymmetrical transformer, however, is believed to be new.

The secondary winding 30 of the transformer 26 is also connected to an arc fault circuit detector 40. The detector 40 is responsive to signals produced on the transformer 26 in response to arcing, that have a distinctive signature or pattern that can be discriminated by the detector 40. Detectors of this type are per se well known. Because the transformer 26 is asymmetrical, arc faults which do not produce a differential current, are detected.

The output of the ground fault/grounded neutral detector 38 and the output of the arc fault detector 40 are connected in parallel by way of polarizing diodes 42, 44 to the input 46 of a switch 48, such as an SCR. The SCR has its anode 50 connected to the base 52 of a switching transistor 54 that is connected to the coil 56 of the relay or contactor 20.

When the scr is activated by either a ground fault or an arc fault, the connection to the base of relay switching transistor 54 is bypassed, switching transistor 54 and relay 20 out of conduction, disconnecting the load. Activating reset switch 111 resets the device.

The combined ground fault and arc fault circuit interrupter of this invention includes circuitry for automatically testing the ground fault and arc fault detectors, the switching circuits, and the relay periodically without the need of operator intervention. An automatic test timer 80 produces pulses at ground fault output 82 and an arc fault output 84 periodically. Preferably the pulses are staggered, so that first the ground fault circuit is tested, then the arc fault circuit is tested, and the cycle repeats continuously. The outputs of the timer are connected to a ground fault test circuit 86 and an arc fault test circuit 88 respectively. The ground fault test circuit 86 produces a high level signal 92 that is connected to one input of nor-gate 73, and produces an energizing signal at a second output 90, which activates fault relay 96, for simulating a ground fault current, between the hot electrical conductor 12 and the neutral conductor 14 on the opposite sides of transformer 22. Preferably, the resistor 98 generates a current of about 10 milliamps, and therefore can be about a 15 k ohm resistor.

The second output 84 of the timer 80 is connected to an input 100 of the arc test simulator 88. The arc test simulator 88 produces a high logic level on a first output 102 thereof which is connected to the other input of nor-gate 73, and a simulated arc signal at its second outputs 104, 105 that are connected to a winding 106 on the asymmetrical transformer 26 that is coupled to the sense winding 30. The arc test simulator 88 should generate a signal simulating the waveform produced by an actual arc to verify operation of the arc detector. The bypass fault current flowing through resistor 98, simulating a ground fault, causes a differential current to pass through transformer 24, activating gfi block 38. Gfi block 38 produces a output signal at 39 which activates gate 46 of scr 48. Conduction of scr 48 pulls junction 107 low and resets auto test timer 80. One shot timer 72 briefly holds the active low state of signal 92, appearing at output 108 of nor-gate 73, when the auto test timer 80 resets gfi test block 86. The output of timer 72 is connected to one input of nand-gate 62. Activation of scr 48 removes the base drive from transistor 54, which acts to disconnect the relay current from relay coil 56, and to drop the voltage across zener diode 109 and transistor 112 to zero. Inverter 60's input is protected from overvoltage by zener diode 121 and resistor 122. When the voltage at 58 drops to zero, invertor 60 activates the other input of nand-gate 62. Nand-gate 62, with both inputs now held high, produces a low trigger signal 123, and activates one shot timer 110 which reconnects base drive to transistor 54, re-energizing relay coil 56, before the relay contacts 20 can open. At the same time, timer 110 activates transistor 66, bypassing scr 48, and switching the scr out of condition. Diode 120 insures that all scr current is bypassed through transistor 66. The time delay of timer 110 is set to be greater than the combined time delay of relay 96 opening plus any delay of gfi block 38 to remove gate drive from scr 48. The above allows the circuitry to be checked without actually disconnecting the load. In a similar manner, when arc fault test 88 is activated afi block 40 causes the same sequence of momentarily disconnecting the relay coil 56.

Transistor 112, resistors 117 and 118, capacitor 119, and timer 114 form a fail safe circuit. Timer 114 is a type that reinitializes its time base at each trigger without causing the output to go low. Each time junction 107 is pulled low by the autotest sequence, the timer trigger input 116 is pulled low by action of capacitor 119 charging. This keeps the timer constantly triggered, and the timer output high, holding transistor 112 in conduction via resistor 117. Resistor 118 acts to hold the trigger input 116 high, and inactive, if capacitor 119 is not periodically charged. The periodic charging must occur in a time less than the time constant of timer 114, or timer output 115 goes low, and disables transistor 112. In this manner transistor 112 will stop conducting, disengaging relay coil 56, if the test sequence is non-functional.

The periodic activation of the gfi test, and then the arc test, is set at a rate so that if either fails to produce a fault indication at junction 107, the periodic trigger pulse frequency appearing at timer trigger 116 drops in half, which is too slow to keep timer 114 triggered; this forces fail safe transistor 112 to open, de-energizing relay 20 and opening the load.

During the occurrence of an actual ground or arc fault, junction 107 will be pulled low when scr 50 is caused to conduct by either gfi block 38 or arc detector block 40. This holds autotest timer 80 in the off state and deactivates the auto reset function. Transistor 54 now stops conducting followed shortly by fail safe transistor 112 opening. Either one of these transistors opens relay 20. The device stays in this state until a reset at 111 occurs.

It is to be understood that many of the timing and logic blocks and some or all of the test and detector blocks could be replaced by a microprocessor.

While the invention has been described in connection with a presently preferred embodiment thereof, those skilled in the art will recognize that certain modifications an changes may be made therein without departing from the true spirit and scope of the invention, which accordingly is intended to defined solely by the appended claims.

What is claimed:

1. A circuit protector comprising a relay having a coil, and contacts arranged to interrupt power to a load when a fault is detected; and a test circuit which creates a simulated fault and momentarily de-energizes the coil to test the protector and then re-energizes the coil before the contacts open.

* * * * *